United States Patent
Aswani et al.

(10) Patent No.: US 12,079,627 B1
(45) Date of Patent: Sep. 3, 2024

(54) PREDICATED COMPARE-EXCHANGE-SHUFFLE INSTRUCTION FOR PARALLEL PROCESSOR

(71) Applicant: QUALCOMM Incorporated, San Diego, CA (US)

(72) Inventors: Himanshu Pradeep Aswani, Bangalore (IN); Mithil Ramteke, Bangalore (IN); Venkata Prema Sai Sravan Patchala, Bangalore (IN); Sridhar Kandimalla, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/189,115

(22) Filed: Mar. 23, 2023

(51) Int. Cl.
  *G06F 9/30* (2018.01)
(52) U.S. Cl.
  CPC ...... *G06F 9/30029* (2013.01); *G06F 9/30032* (2013.01)
(58) Field of Classification Search
  CPC .......................... G06F 9/30029; G06F 9/30032
  See application file for complete search history.

(56) References Cited

U.S. PATENT DOCUMENTS

| | | | | |
|---|---|---|---|---|
| 8,078,836 | B2* | 12/2011 | Sperber | G06F 9/30109 712/22 |
| 9,218,182 | B2* | 12/2015 | Ermolaev | G06F 9/30098 |
| 11,361,401 | B2* | 6/2022 | Tu | G06T 1/20 |
| 2021/0132950 | A1* | 5/2021 | Espasa | G06F 9/3853 |

OTHER PUBLICATIONS

Stone H. S., "Parallel Processing with the Perfect Shuffle", IEEE Transactions on Computers, vol. c-20, No. 2, Feb. 1971, pp. 153-161.

* cited by examiner

*Primary Examiner* — Corey S Faherty
(74) *Attorney, Agent, or Firm* — QUALCOMM Incorporated

(57) ABSTRACT

A processor-implemented method for executing a hardware intrinsic programming instruction, includes performing one or more Boolean operations in combination with one or more permutation operations in response to the hardware intrinsic programming instruction being a single predicated compare-exchange-shuffle programming instruction. The method also includes outputting a sub-sorted list after the performing of the one or more Boolean operation in combination with the one or more permutation operation.

24 Claims, 6 Drawing Sheets

(1.1) $RR\_1\_low[i] = (register\_predicate[i] \otimes (R1[i] > R2[i]))\ ?\ R1[i] : R2[i]$
(1.2) $RR\_1\_high[i] = (register\_predicate[i] \otimes (R1[i] > R2[i]))\ ?\ R2[i] : R1[i]$
(1.3) $RR = shuffle(RR\_1\_low, RR\_2\_low, S)$

| R1 R2 P1 | StageMask | P2=XOR(P1, StageMask) | D1 D2 |
|---|---|---|---|
| 5  1  1 | 0 | 1 | 1  5 |
| 3  2  1 | 1 | 0 | 3  2 |
| 4  6  0 | 0 | 0 | 4  6 |
| 9  7  1 | 1 | 0 | 9  7 |

Shuffle (D1, D2, S) -> R1 R2, where S=1

(1.1) RR_1_low[i] = (register_predicate[i] ⊗ (R1[i]>R2[i])) ? R1[i] : R2[i]
(1.2) RR_1_high[i] = (register_predicate[i] ⊗ (R1[i]>R2[i])) ? R2[i] : R1[i]
(1.3) RR = shuffle(RR_1_low, RR_2_low, S)

*FIG. 4*

| R1 | R2 | StageMask | D1 | D2 |
|----|----|-----------|----|----|
| 5  | 1  | 0         | 1  | 5  |
| 3  | 2  | 1         | 3  | 2  |
| 4  | 6  | 0         | 4  | 6  |
| 9  | 7  | 1         | 9  | 7  |

Shuffle (D1, D2, S) -> R1 R2, where S=1

*FIG. 5*

PREDICATED COMPARE-EXCHANGE-SHUFFLE INSTRUCTION FOR PARALLEL PROCESSOR

BACKGROUND

Field

Aspects of the present disclosure relate to instructions for computing devices, and more specifically to a single compare-exchange-shuffle instruction for execution by a parallel processor.

Background

Computing devices include mobile phones, laptops, palm-top and tablet computers, portable digital assistants (PDAs), portable game consoles, and other portable electronic devices. Computing devices may also be deployed in robotic devices and automobiles, for example, to implement self-navigation. Connected home devices also include computing devices. Computing devices are comprised of many electrical components, such as system-on-a-chip (SoC) devices, graphics processing unit (GPU) devices, neural processing unit (NPU) devices, digital signal processors (DSPs), and modems, among others.

Neural network processing may be performed with any of these components, for example, to detect objects. When detecting objects, it may be desirable to rank the detected objects by employing sorting techniques. Existing sorting techniques, however, may become a performance bottleneck while operating the computing device. It would be desirable to improve the processing speed for performing sorting operations.

SUMMARY

In aspects of the present disclosure, a processor-implemented method for executing a hardware intrinsic programming instruction includes performing one or more Boolean operations in combination with one or more permutation operations in response to the hardware intrinsic programming instruction comprising a single predicated compare-exchange-shuffle programming instruction. The method also includes outputting a sub-sorted list after the performing of the one or more Boolean operations in combination with the one or more permutation operations.

Other aspects of the present disclosure are directed to an apparatus for executing a hardware intrinsic programming instruction. The apparatus includes means for performing one or more Boolean operations in combination with one or more permutation operations in response to the hardware intrinsic programming instruction comprising a single predicated compare-exchange-shuffle programming instruction. The apparatus also includes means for outputting a sub-sorted list after the performing of the one or more Boolean operations in combination with the one or more permutation operations.

Other aspects of the present disclosure are directed to an apparatus for executing a hardware intrinsic programming instruction. The apparatus has a memory and one or more processors coupled to the memory. The processor(s) is configured to perform one or more Boolean operations in combination with one or more permutation operations in response to the hardware intrinsic programming instruction comprising a single predicated compare-exchange-shuffle programming instruction. The processor(s) is also configured to output a sub-sorted list after the performing of the one or more Boolean operations in combination with the one or more permutation operations.

In other aspects of the present disclosure, a non-transitory computer-readable medium with program code recorded thereon is disclosed. The program code is executed by at least one processor and includes program code to perform one or more Boolean operations in combination with one or more permutation operations in response to a hardware intrinsic programming instruction comprising a single predicated compare-exchange-shuffle programming instruction. The program code also includes program code to output a sub-sorted list after the performing of the one or more Boolean operations in combination with the one or more permutation operations.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

FIG. 4 illustrates a single predicated compare-exchange-shuffle instruction, in accordance with aspects of the present disclosure.

FIG. 5 is a table illustrating an example of values of registers for executing the single predicated compare-exchange-shuffle instruction, in accordance with aspects of the present disclosure.

DETAILED DESCRIPTION

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts.

As described, the use of the term "and/or" is intended to represent an "inclusive OR," and the use of the term "or" is intended to represent an "exclusive OR." As described, the term "exemplary" used throughout this description means "serving as an example, instance, or illustration," and should not necessarily be construed as preferred or advantageous over other exemplary configurations. As described, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described, the term "proximate" used throughout this description means "adjacent, very near, next to, or close to." As described, the term "on" used throughout this description means "directly on" in some configurations, and "indirectly on" in other configurations.

It would be desirable to improve the processing speed for ranking or sorting data arrays. For example, a parallel processor, such as a single instruction, multiple data (SIMD) processor, may be employed to execute a single predicated compare-exchange-shuffle instruction to improve sorting. According to aspects of the present disclosure, a single compare-exchange-shuffle instruction is introduced for execution on a parallel processing device.

Particular aspects of the subject matter described in this disclosure can be implemented to realize one or more of the following potential advantages. In some examples, the described techniques, such as performing at least one Boolean operation in combination with at least one permutation operation in response to a hardware intrinsic programming instruction, may improve processing speed and reduce a number of registers for performing sort operations.

Figure 1:
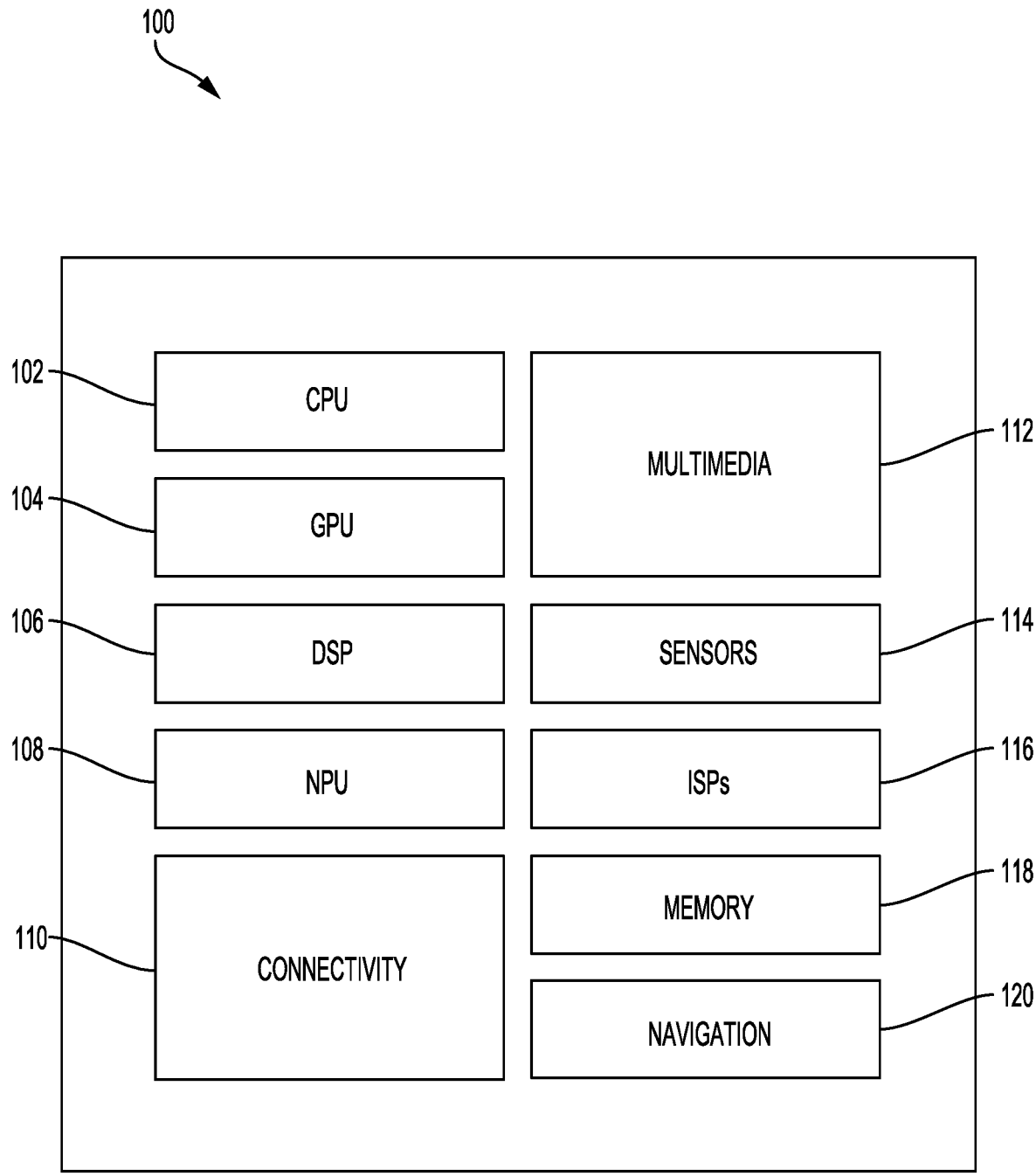
FIG. 1 illustrates an example implementation of a host system-on-a-chip (SoC), including a processor for executing a single compare-exchange-shuffle instruction, in accordance with certain aspects of the present disclosure.

FIG. 1 illustrates an example implementation of a host system-on-a-chip (SoC) 100, capable of executing a single compare-exchange-shuffle instruction, in accordance with aspects of the present disclosure. The host SoC 100 includes processing blocks tailored to specific functions, such as a connectivity block 101. The connectivity block 110 may include fifth generation (5G) connectivity, fourth generation long term evolution (4G LTE) connectivity, Wi-Fi connectivity, universal serial bus (USB) connectivity, Bluetooth® connectivity, Secure Digital (SD) connectivity, and the like.

In this configuration, the host SoC 100 includes various processing units that support multi-threaded operation. For the configuration shown in FIG. 1, the host SoC 100 includes a multi-core central processing unit (CPU) 102, a graphics processor unit (GPU) 104, a digital signal processor (DSP) 106, and a neural processor unit (NPU) 108. The host SoC 100 may also include a sensor processor 114, image signal processors (ISPs) 116, a navigation module 120, which may include a global positioning system (GPS), and a memory 118. The multi-core CPU 102, the GPU 104, the DSP 106, the NPU 108, and the multi-media engine 112 support various functions such as video, audio, graphics, gaming, artificial networks, and the like. Each processor core of the multi-core CPU 102 may be a reduced instruction set computing (RISC) machine, an advanced RISC machine (ARM), a microprocessor, or some other type of processor. The NPU 108 may be based on an ARM instruction set.

As noted above, it would be desirable to improve the processing speed for sorting or ranking data arrays. Aspects of the present disclosure introduce a single compare-exchange-shuffle instruction for execution on a parallel processing device. The instruction performs at least one Boolean operation in combination with at least one permutation operation. The instruction may be a single predicated compare-exchange-shuffle programming instruction, in some aspects including Boolean comparison and exclusive or (XOR) operations, and also including exchange and shuffle permutation operations. To execute the instruction, the processor may receive as input: a register predicate, multiple registers, and a scalar for the shuffle operation. The processor may output a sub-sorted list after performing the Boolean operations in combination with the permutation operations.

According to aspects of the present disclosure, a computing device includes means for performing at least one Boolean operation in combination with at least one permutation operation. The computing device may include means for outputting a sub-sorted list, and means for receiving input. In one configuration, the performing means, the outputting means, and the receiving means may be the CPU, GPU, DSP, NPU, ISP, connectivity module, and/or memory, as shown in FIG. 1. In other aspects, the aforementioned means may be any structure or any material configured to perform the functions recited by the aforementioned means.

Automotive and robotics domains may specify the system to detect objects, for example, for safely navigating their environment. To enable safe navigation, the system ranks different hurdles as quickly as possible. For example, a vehicle may determine how far away objects are from the vehicle by ranking the objects. Connected homes may be monitored by intelligent systems that engage in productivity trade-off computations to ensure reliable connectivity at a low cost. The trade-offs specify frequent ranking of the possibilities. Real-time artificial intelligence (AI) software apps that run on mobile platforms frequently rank various content. In all of these scenarios, improving the processing speed for the ranking operation would be desirable.

Various neural networks (NNs) implement a TopK operation that performs a sorting operation and returns the top K values from N elements in a sorted fashion. This operation is key in object detection tasks where the neural network detects the most interesting objects from a plethora of identifiable objects in the scene, as quickly as possible. Currently, the TopK operation is among the costliest operations within the models, in terms of time, accounting for 10% of model runtime. If the values of N and K are greater than a threshold, optimal solutions may be impractical and scalars are employed, instead. In other words, the fallback option is an optimal single thread solution of a heap sort or a merge sort. In other words, single instruction, multiple data (SIMD) based algorithms may be impractical after a threshold, and non SIMD based optimal algorithms are then invoked.

A TopK operation may employ a Bitonic sorting process. The Bitonic sorting process may be efficiently implemented on a parallel processor, such as a single instruction, multiple data (SIMD) processor. The technique may be scaled for larger values of K and N, while also improving performance. The technique of the present disclosure provides significant gains compared to the baseline approach. As noted above, the sorting operations may cause performance bottlenecks. If this bottleneck remains, hardware processors are limited, in time or performance, in executing sorting operations. Aspects of the present disclosure speed up the sorting process, by efficiently executing comparison, exchange, and shuffle operations, which are core components of the stages in the Bitonic sorting technique.

Bitonic sorting sorts an array of inputs by requiring multiple comparisons in parallel. A shuffle operation, whose nature is known beforehand, is subsequently performed to prepare the data for the next stage. Thus, an SIMD processor is useful in this regard. The Bitonic sorting technique also dictates a 'stage mask' to decide where the minimum and maximum values of a comparison operation should end up before the shuffle is performed.

One reason for the performance bottleneck is that a sequence of operations needs to be executed sequentially on a parallel processor, such as an SIMD processor. The operations occur sequentially because each operation relies on results from a previous operation. Logical and resource constraints dictate the sequential arrangement of the instructions.

The sequence of operations includes a comparison operation, an exclusive or (XOR) operation, an exchange operation, and a shuffle operation. In the following description, P represents a predicate, R represents a register, RR represents an output register pair, and S is a scalar parameter related to shuffling. Two registers, R1 and R2, hold a fixed number of bytes, which are fed into a certain stage of the Bitonic sort process. A stage mask, as well as a scalar S that describes the shuffle, for this stage are pre-known. The stage mask may also be referred to as a register predicate. The S parameter, in combination with the stage mask, is responsible for determining where higher and lower values should be placed in the output register pair RR.

The current implementation is as follows: (1) generate a predicate using one of the various comparison instructions, (2) combine the predicate with the stage mask via an XOR operation to arrive at a final mask, which is (3) fed to a swap instruction to achieve the desired data rearrangement, and (4) perform the corresponding shuffle for that stage. This process takes a total of four instructions that must occur in a sequential fashion.

Figures 2, 3:
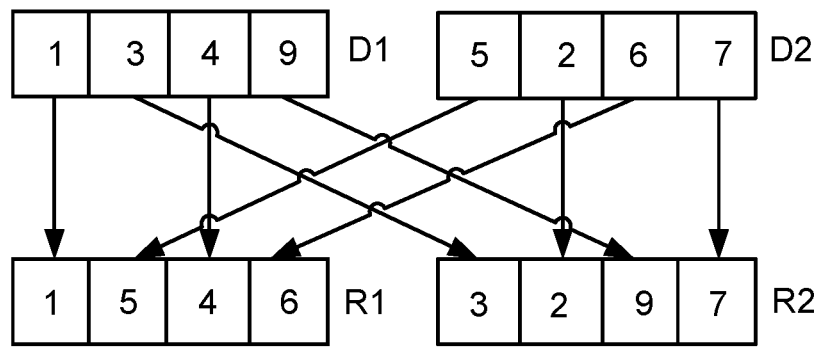
FIG. 2 is a table illustrating an example of values for various registers in a current sorting process.
FIG. 3 illustrates an example of an existing shuffle operation.

More detail of the operation sequence is now provided. The first operation is a comparison operation where the predicate P1[i]=1 if the value in the register R1[i]>R2[i] for each index i. Otherwise, the predicate P1[i]=0. FIG. 2 is table illustrating an example of values for various registers in a current process. In the example of FIG. 2, the registers R1, R2 store four values each. The register R1 stores the values 5, 3, 4, and 9. The register R2 stores the values 1, 2, 6, and 7. In the first operation, the values of R1 and R2 are compared. Because 5 is greater than 1, the predicate value P1[1] is 1. The predicate value P1[2] is 1 because 3 is greater than 2. The predicate value P1[3] is 0 because 4 is NOT greater than 6. The predicate value P1[4] is 1 because 9 is greater than 7.

The next operation is an XOR operation with an algorithm constant, also referred to as a stage mask or a predicate register. The stage mask defines how the sorting will occur, and in the example of FIG. 2=[0, 1, 0, 1]. Based on an XOR operation between the stage mask and the predicate P1[i], the predicate P2[i] is calculated, that is: P2[i]=stage_mask[i]⊗P1[i], where ⊗ represents the Boolean XOR operation. As seen in the example of FIG. 2, the result of the XOR operation results in the P2 values: [1, 0, 0, 0] because P1[1]⊗0=1, P1[2] ⊗ 1=0, P1[3] ⊗0=0, and P1[4]⊗1=0.

The next operation in the sequence is an exchange operation. The exchange operation obtains the values of the register pair [RR] RR_1. A first part of a register pair: RR_1_low[i] is obtained by setting RR_1_low[i]=R2[i] if (P2[i])=1. Otherwise, RR_1_low[i]=R1[i]. In the example of FIG. 2, (where RR_1_low[i] is represented as D1 in FIG. 2), RR_1_low[1]=1, RR_1_low[2]=3, RR_1_low[3]=4, and RR_1_low[4]=9.

The exchange operation sets RR_1_high[i]=R1[i], if P2[i]=1. Otherwise, RR_1_high[i]=R2[i]. As noted above, in FIG. 2, RR_1_high[i] is shown as D2. In the example of FIG. 2, RR_1_high[1]=5, RR_1_high[2]=2, RR_1_high[3]=6, and RR_1_high[4]=7.

The next operation of the sequence is a shuffle operation where the registers R1 and R2 are reset. The shuffle operation takes as input the D1 and D2 arrays (also referred to as the RR_1_low and RR_1_high registers) and a shuffle parameter, referred to as S=1, in this example. The shuffle operation is defined as R1 R2=shuffle(RR_1_low, RR_1_high, S).

FIG. 3 illustrates an example of an existing shuffle operation. In the example of FIG. 3, a first register D1 includes the values [1, 3, 4, 9]. A second register D2 includes the values [5, 2, 6, 7]. Based on a shuffle parameter S having a value of 1, the registers R1 and R2 have the following values, respectively [1, 5, 4, 6] and [3, 2, 9, 7].

According to aspects of the present disclosure, a hardware intrinsic programming instruction is defined to address the performance bottleneck resulting from the existing sequence of operations. It is noted that the first two operations, comparison and XOR, are Boolean operations. The third and fourth operations are permutations or data movements, where no values are modified. The hardware intrinsic instruction may take the form ces(R1, R2, S, stage_mask) to perform the four operations, where the inputs to the function are the registers R1 and R2, the shuffle parameter S, and the register predicate (e.g., stage mask) that defines the sorting technique. This instruction may be performed in-place, meaning no additional or temporary registers are used.

For the new instruction, the predicated compare-exchange-shuffle instruction (ces) receives, as an input, a register predicate, as well as two registers and the scalar, and performs an internal comparison between the two vectors at a unit level. A unit refers to a byte, halfword, or word. The instruction places the lower and higher values in the intermediate register pair RR_1 following the direction of the register predicate. The comparison is followed by a shuffle (governed by S) to arrive at the final placement of values and the instruction then stores the result in a register pair. The predicate is used in conjunction with the comparison's direction (greater or lower) to determine where the two values at each unit level are to be placed before the shuffle is performed. These computations may be performed upon a single call of the compare-exchange-shuffle instruction. This instruction is helpful as it reduces a multi-step sequence of instructions to a single instruction.

FIG. 4 illustrates a single predicated compare-exchange-shuffle instruction, in accordance with aspects of the present disclosure. FIG. 5 is a table illustrating an example of values of registers for executing the single predicated compare-exchange-shuffle instruction, in accordance with aspects of the present disclosure. In the example of FIGS. 4 and 5, at step (1.1), a first of a register pair RR_1_low[i] (also referred to as D1) is set based on an XOR operation between the register predicate and whether the value of R1[i] is greater than the value of R2[i]. For implementation purposes, a compare block may be placed next to an XOR block. If the result of the XOR operation is 0, the value of R1[i] is selected. If the result of the operation is 1, the value of R2[i] is selected. For example, for the first index, the value of R1[1]=5 is greater than R2[2]=1. Thus, the result of the XOR operation with the stage mask (also referred to as register predicate) and R1[1] being greater than R2[1] returns the value of the R2[1] register. Similarly, the remaining values for D1 are set, such that the register D1=[1, 3, 4, 9].

At step (1.2), a second of the register pair RR_1_high[i] (referred to as D2 in FIG. 5) is set based on an XOR operation between the register predicate and whether the value of R1[i] is greater than the value of R2[i]. If the result of the XOR operation is 0, the value of R2[i] is selected. If the result of the XOR operation is 1, the value of R1[i] is selected. For example, for the first index, the value of R1[1]=5 is greater than R2[2]=1. Thus, the result of the XOR operation with the stage mask (also referred to as register predicate) and R1[1] being greater than R2[1] returns the value of the R1[1] register. Similarly, the remaining values for D2 are set, such that the register D2=[5, 2, 6, 7].

After determining the values for the register pair D1, D2 (also referred to as RR_1_low[i], RR_1_high[i]), at step (1.3), a shuffle operation may be performed. The shuffle operation obtains new values for the registers R1 and R2, as described above, based on the shuffle parameter S and the register pair D1, D2 (also referred to as RR_1_low[i], RR_1_high[i]). In some aspects, wiring may be defined to perform the exchange and shuffle of data back into the input registers.

The comparison operation on multiple registers may also be extended to perform exchange and shuffle operations on multiple registers, at an algorithmic level. At the algorithmic level, the comparison decisions from multiple pairs of registers may be combined using other Boolean operations such as AND, OR, and NOT. The results then pass through the XOR operation, along with the stage mask to arrive at the final mask (e.g., P2) which is used to exchange data across multiple pairs of input registers.

In aspects of the present disclosure, this instruction may potentially perform two instructions at once, a minimum function and a maximum function, with an appropriate value of S. Performing the maximum and minimum functions over two registers may be implemented by setting the state mask to all 0s. The exchange results in a minimum register and a maximum register. The parameter S is set to 0 to prevent any shuffling. The user can select which of the registers is a high register and which of the registers is a low register. Performing two instructions at once further improves processor efficiency.

The introduction of this hardware instruction combines specific useful patterns of Boolean operations and permutations. The solution may reduce latency times as well as reduce a memory footprint by designing component blocks more optimally. Compared to existing approaches of four or more instructions, a single instruction performs the operations, improving the developer experience while adhering to modular principles. Speed around this bottleneck, which makes up a significant portion of the sort operation, is improved by the factor of four times (4× latency per instruction). Power consumption and register use may be reduced by 50% as well.

As discussed above, TopK operations for ranking purposes may be involved to deliver real-time AI use cases. These AI use cases would benefit from the improved instruction. Other AI operations with ranking or sorting would also benefit. Even non-AI use cases that wish to leverage parallel processors for sorting would benefit from the single instruction. Moreover, the compare-exchange-shuffle instruction has applications beyond Bitonic sorting. Various sorting solutions include some form of comparison, exchange, and shuffle. Those solutions may potentially include the compare-exchange-shuffle instruction of the present disclosure.

The techniques of the present disclosure allow delivery of higher frames per second (FPS) for numerous automotive use-cases that employ TopK operations with higher values of K than are commonplace in mobile applications. The techniques ensure this operation does not form a potential bottleneck, thereby improving performance over the broader suite of automotive neural networks. Specifically, the techniques of the present disclosure improve memory efficiency for all values of K.

Figure 6:
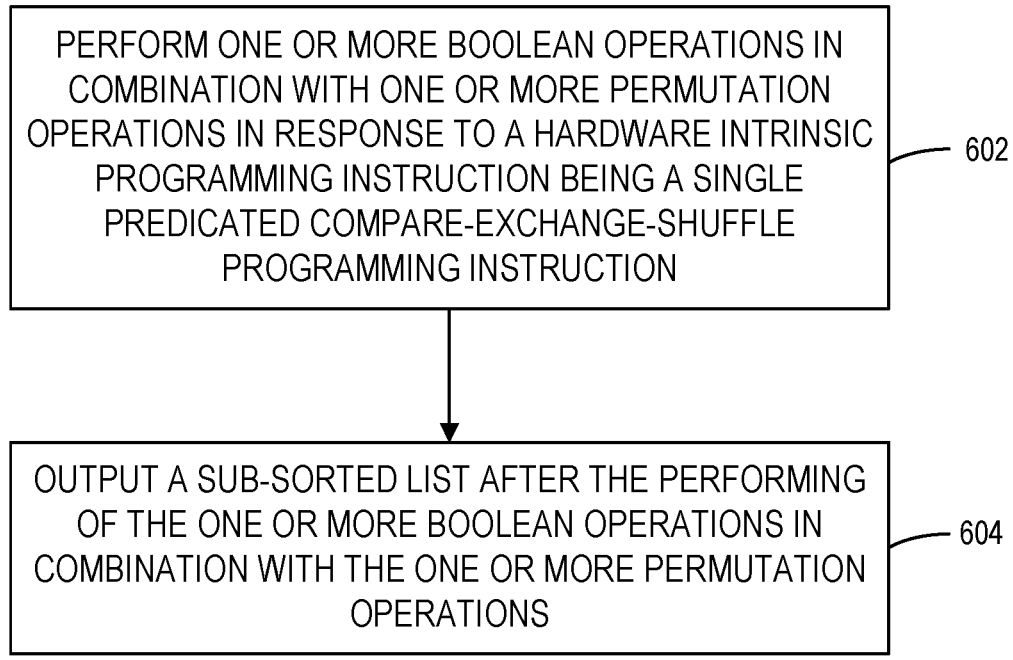
FIG. 6 is a flow diagram illustrating an example process performed, for example, by a computing device, in accordance with various aspects of the present disclosure.

FIG. 6 is a flow diagram illustrating an example process 600 performed, for example, by a computing device, in accordance with various aspects of the present disclosure. The example process 600 is an example of performing at least one Boolean operation in combination with at least one permutation operation. As shown in FIG. 6, in some aspects, the process 600 may include performing one or more Boolean operation in combination with at least one permutation operation in response to a hardware intrinsic programming instruction comprising a single predicated compare-exchange-shuffle programming instruction (block 602). For example, the at least one Boolean operation may be a comparison operation and an exclusive or (XOR) operation, and the at least one permutation operation may be an exchange operation and a shuffle operation.

In some aspects, the process 600 may include outputting a sub-sorted list after the performing of the one or more Boolean operation in combination with the one or more permutation operation (block 604). For example, the sub-sorted list may be a Bitonic sub-sorted list, where subsequences are Bitonic. In the event of a last bottleneck, the instructions result in an entirely sorted list. A separate set of operations may be performed between instances of the bottleneck to obtain a sorted list.

Figure 7:
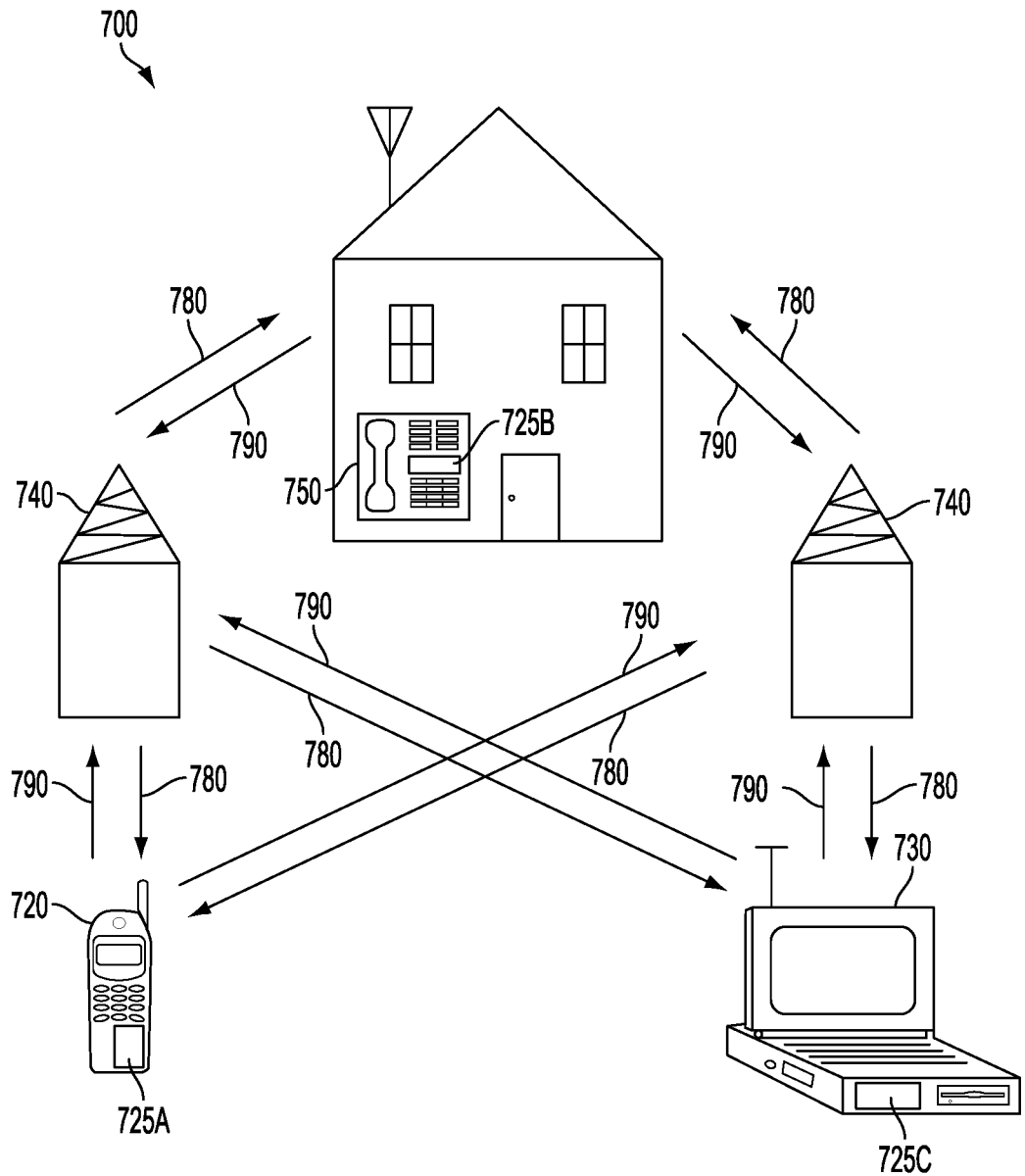
FIG. 7 is a block diagram showing an exemplary wireless communications system in which a configuration of the present disclosure may be advantageously employed.

FIG. 7 is a block diagram showing an exemplary wireless communications system 700, in which an aspect of the present disclosure may be advantageously employed. For purposes of illustration, FIG. 7 shows three remote units 720, 730, and 750, and two base stations 740. It will be recognized that wireless communications systems may have many more remote units and base stations. Remote units 720, 730, and 750 include integrated circuit (IC) devices 725A, 725B, and 725C that include the disclosed compare-exchange-shuffle instruction. It will be recognized that other devices may also include the disclosed compare-exchange-shuffle instruction, such as the base stations, switching devices, and network equipment. FIG. 7 shows forward link signals 780 from the base stations 740 to the remote units 720, 730, and 750, and reverse link signals 790 from the remote units 720, 730, and 750 to the base stations 740.

In FIG. 7, remote unit 720 is shown as a mobile telephone, remote unit 730 is shown as a portable computer, and remote unit 750 is shown as a fixed location remote unit in a wireless local loop system. For example, the remote units may be a mobile phone, a hand-held personal communication systems (PCS) unit, a portable data unit, such as a personal data assistant, a GPS enabled device, a navigation device, a set top box, a music player, a video player, an entertainment unit, a fixed location data unit, such as meter reading equipment, or other device that stores or retrieves data or computer instructions, or combinations thereof. Although FIG. 7 illustrates remote units according to the aspects of the present disclosure, the disclosure is not limited to these exemplary illustrated units. Aspects of the present disclosure may be suitably employed in many devices, which include the disclosed compare-exchange-shuffle instruction.

Figure 8:
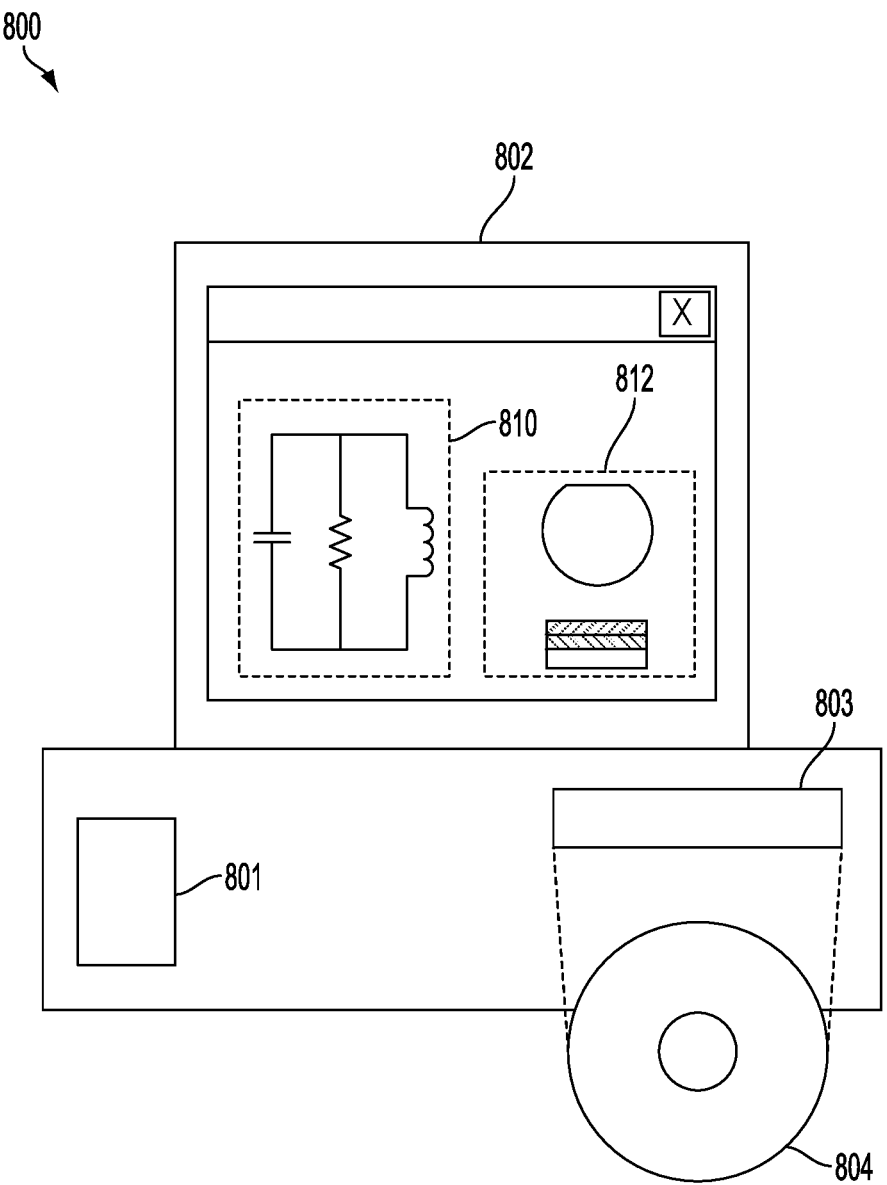
FIG. 8 is a block diagram illustrating a design workstation used for circuit, layout, and logic design of components, in accordance with various aspects of the present disclosure.

FIG. 8 is a block diagram illustrating a design workstation 800 used for circuit, layout, and logic design of a semiconductor component, such as the compare-exchange-shuffle instruction disclosed above. The design workstation 800 includes a hard disk 801 containing operating system software, support files, and design software such as Cadence or OrCAD. The design workstation 800 also includes a display 802 to facilitate design of a circuit 810 or a semiconductor component 812, such as the compare-exchange-shuffle instruction. A storage medium 804 is provided for tangibly storing the design of the circuit 810 or the semiconductor component 812 (e.g., the PLD). The design of the circuit 810 or the semiconductor component 812 may be stored on the storage medium 804 in a file format such as GDSII or GERBER. The storage medium 804 may be a CD-ROM, DVD, hard disk, flash memory, or other appropriate device. Furthermore, the design workstation 800 includes a drive apparatus 803 for accepting input from or writing output to the storage medium 804.

Data recorded on the storage medium 804 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 804 facilitates the design of the circuit 810 or the semiconductor component 812 by decreasing the number of processes for designing semiconductor wafers.

Example Aspects

Aspect 1: A processor-implemented method for executing a hardware intrinsic programming instruction, comprising: performing at least one Boolean operation in combination with at least one permutation operation in response to the hardware intrinsic programming instruction comprising a single predicated compare-exchange-shuffle programming instruction; and outputting a sub-sorted list after the performing of the at least one Boolean operation in combination with the at least one permutation operation.

Aspect 2: The processor-implemented method of Aspect 1, in which the at least one Boolean operation comprises a comparison operation and an exclusive or (XOR) operation.

Aspect 3: The processor-implemented method of Aspect 1 or 2, in which the at least one permutation operation comprises an exchange operation and a shuffle operation.

Aspect 4: The processor-implemented method of any of the preceding Aspects, further comprising receiving as input: a register predicate, a plurality of registers, and a scalar associated with the shuffle operation.

Aspect 5: The processor-implemented method of any of the preceding Aspects, in which the comparison operation operates on a plurality of registers.

Aspect 6: The processor-implemented method of any of the preceding Aspects, in which the sub-sorted list comprises a Bitonic sub-sorted list.

Aspect 7: An apparatus for executing a hardware intrinsic programming instruction, comprising: means for performing at least one Boolean operation in combination with at least one permutation operation in response to the hardware intrinsic programming instruction comprising a single predicated compare-exchange-shuffle programming instruction; and means for outputting a sub-sorted list after the performing of the at least one Boolean operation in combination with the at least one permutation operation.

Aspect 8: The apparatus of Aspect 7, in which the at least one Boolean operation comprises a comparison operation and an exclusive or (XOR) operation.

Aspect 9: The apparatus of Aspect 7 or 8, in which the at least one permutation operation comprises an exchange operation and a shuffle operation.

Aspect 10: The apparatus of any of the Aspects 7-9, further comprising means for receiving as input: a register predicate, a plurality of registers, and a scalar associated with the shuffle operation.

Aspect 11: The apparatus of any of the Aspects 7-10, in which the comparison operation operates on a plurality of registers.

Aspect 12: The apparatus of any of the Aspects 7-11, in which the sub-sorted list comprises a Bitonic sub-sorted list.

Aspect 13: An apparatus for executing a hardware intrinsic programming instruction, comprising: a memory; and at least one processor coupled to the memory, the at least one processor configured: to perform at least one Boolean operation in combination with at least one permutation operation in response to the hardware intrinsic programming instruction comprising a single predicated compare-exchange-shuffle programming instruction; and to output a sub-sorted list after the performing of the at least one Boolean operation in combination with the at least one permutation operation.

Aspect 14: The apparatus of Aspect 13, in which the at least one Boolean operation comprises a comparison operation and an exclusive or (XOR) operation.

Aspect 15: The apparatus of Aspect 13 or 14, in which the at least one permutation operation comprises an exchange operation and a shuffle operation.

Aspect 16: The apparatus of any of the Aspects 13-15, in which the at least one processor is further configured to receive as input: a register predicate, a plurality of registers, and a scalar associated with the shuffle operation.

Aspect 17: The apparatus of any of the Aspects 13-16, in which the comparison operation operates on a plurality of registers.

Aspect 18: The apparatus of any of the Aspects 13-17, in which the sub-sorted list comprises a Bitonic sub-sorted list.

Aspect 19: A non-transitory computer-readable medium having program code recorded thereon, the program code executed by at least one processor and comprising: program code to perform at least one Boolean operation in combination with at least one permutation operation in response to the hardware intrinsic programming instruction comprising a single predicated compare-exchange-shuffle programming instruction; and program code to output a sub-sorted list after the performing of the at least one Boolean operation in combination with the at least one permutation operation.

Aspect 20: The non-transitory computer-readable medium of Aspect 19, in which the at least one Boolean operation comprises a comparison operation and an exclusive or (XOR) operation.

Aspect 21: The non-transitory computer-readable medium of Aspect 19 or 20, in which the at least one permutation operation comprises an exchange operation and a shuffle operation.

Aspect 22: The non-transitory computer-readable medium of any of the Aspects 19-21, in which the program code further comprises program code to receive as input: a register predicate, a plurality of registers, and a scalar associated with the shuffle operation.

Aspect 23: The non-transitory computer-readable medium of any of the Aspects 19-22, in which the comparison operation operates on a plurality of registers.

Aspect 24: The non-transitory computer-readable medium of any of the Aspects 19-23, in which the sub-sorted list comprises a Bitonic sub-sorted list.

For a firmware and/or software implementation, the methodologies may be implemented with modules (e.g., procedures, functions, and so on) that perform the functions described. A machine-readable medium tangibly embodying instructions may be used in implementing the methodologies described. For example, software codes may be stored in a memory and executed by a processor unit. Memory may be implemented within the processor unit or external to the processor unit. As used, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include random access memory (RAM), read-only memory (ROM), electrically erasable read-only memory (EEPROM), compact disc read-only memory (CD-ROM) or other optical disk storage, magnetic disk storage or other magnetic storage devices, or other medium that can be used to store desired program code in the form of instructions or data structures and that can be accessed by a computer. Disk and disc, as used, include compact disc (CD), laser disc, optical disc, digital versatile disc (DVD), floppy disk, and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present disclosure is not intended to be limited to the particular configurations of the process, machine, manufacture, composition of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding configurations described may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the present disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in RAM, flash memory, ROM, erasable programmable read-only memory (EPROM), EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the present disclosure is provided to enable any person skilled in the art to make or use the present disclosure. Various modifications to the disclosure will be readily apparent to those skilled in the art, and the generic principles defined may be applied to other variations without departing from the spirit or scope of the disclosure. Thus, the present disclosure is not intended to be limited to the examples and designs described, but is to be accorded the widest scope consistent with the principles and novel features disclosed.

What is claimed is:

1. A processor-implemented method for executing a hardware intrinsic programming instruction, comprising:
performing at least one Boolean operation in combination with at least one permutation operation in response to the hardware intrinsic programming instruction comprising a single predicated compare-exchange-shuffle programming instruction; and
outputting a sub-sorted list after the performing of the at least one Boolean operation in combination with the at least one permutation operation.

2. The processor-implemented method of claim 1, in which the at least one Boolean operation comprises a comparison operation and an exclusive or (XOR) operation.

3. The processor-implemented method of claim 2, in which the at least one permutation operation comprises an exchange operation and a shuffle operation.

4. The processor-implemented method of claim 3, further comprising receiving as input: a register predicate, a plurality of registers, and a scalar associated with the shuffle operation.

5. The processor-implemented method of claim 2, in which the comparison operation operates on a plurality of registers.

6. The processor-implemented method of claim 1, in which the sub-sorted list comprises a Bitonic sub-sorted list.

7. An apparatus for executing a hardware intrinsic programming instruction, comprising:
means for performing at least one Boolean operation in combination with at least one permutation operation in response to the hardware intrinsic programming instruction comprising a single predicated compare-exchange-shuffle programming instruction; and
means for outputting a sub-sorted list after the performing of the at least one Boolean operation in combination with the at least one permutation operation.

8. The apparatus of claim 7, in which the at least one Boolean operation comprises a comparison operation and an exclusive or (XOR) operation.

9. The apparatus of claim 8, in which the at least one permutation operation comprises an exchange operation and a shuffle operation.

10. The apparatus of claim 9, further comprising means for receiving as input: a register predicate, a plurality of registers, and a scalar associated with the shuffle operation.

11. The apparatus of claim 8, in which the comparison operation operates on a plurality of registers.

12. The apparatus of claim 7, in which the sub-sorted list comprises a Bitonic sub-sorted list.

13. An apparatus for executing a hardware intrinsic programming instruction, comprising:
a memory; and
at least one processor coupled to the memory, the at least one processor configured:
to perform at least one Boolean operation in combination with at least one permutation operation in response to the hardware intrinsic programming instruction comprising a single predicated compare-exchange-shuffle programming instruction; and
to output a sub-sorted list after the performing of the at least one Boolean operation in combination with the at least one permutation operation.

14. The apparatus of claim 13, in which the at least one Boolean operation comprises a comparison operation and an exclusive or (XOR) operation.

15. The apparatus of claim 14, in which the at least one permutation operation comprises an exchange operation and a shuffle operation.

16. The apparatus of claim 15, in which the at least one processor is further configured to receive as input: a register predicate, a plurality of registers, and a scalar associated with the shuffle operation.

17. The apparatus of claim 14, in which the comparison operation operates on a plurality of registers.

18. The apparatus of claim 13, in which the sub-sorted list comprises a Bitonic sub-sorted list.

19. A non-transitory computer-readable medium having program code recorded thereon, the program code executed by at least one processor and comprising:
program code to perform at least one Boolean operation in combination with at least one permutation operation in response to the hardware intrinsic programming instruction comprising a single predicated compare-exchange-shuffle programming instruction; and
program code to output a sub-sorted list after the performing of the at least one Boolean operation in combination with the at least one permutation operation.

20. The non-transitory computer-readable medium of claim 19, in which the at least one Boolean operation comprises a comparison operation and an exclusive or (XOR) operation.

21. The non-transitory computer-readable medium of claim 20, in which the at least one permutation operation comprises an exchange operation and a shuffle operation.

22. The non-transitory computer-readable medium of claim 21, in which the program code further comprises program code to receive as input: a register predicate, a plurality of registers, and a scalar associated with the shuffle operation.

23. The non-transitory computer-readable medium of claim 20, in which the comparison operation operates on a plurality of registers.

24. The non-transitory computer-readable medium of claim 19, in which the sub-sorted list comprises a Bitonic sub-sorted list.

* * * * *